US 8,099,308 B2

(12) United States Patent
Uyeki

(10) Patent No.: US 8,099,308 B2
(45) Date of Patent: Jan. 17, 2012

(54) METHOD AND SYSTEM FOR VEHICLE SERVICE APPOINTMENTS BASED ON DIAGNOSTIC TROUBLE CODES

(75) Inventor: Robert Uyeki, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 800 days.

(21) Appl. No.: 11/866,372

(22) Filed: Oct. 2, 2007

(65) Prior Publication Data

US 2009/0089134 A1 Apr. 2, 2009

(51) Int. Cl.
*G06Q 99/00* (2006.01)
*H04H 20/71* (2008.01)

(52) U.S. Cl. ..... 705/5; 705/7.13; 340/539.1; 455/152.1; 701/29; 701/30; 701/33

(58) Field of Classification Search .................... 705/1.1, 705/7–9, 35, 5; 701/29–30, 1, 33; 340/539.1; 455/152.1
See application file for complete search history.

(56) References Cited

U.S. PATENT DOCUMENTS

| | | |
|---|---|---|
| 3,646,580 A | 2/1972 | Fuller et al. |
| 3,839,701 A | 10/1974 | Pomerantz |
| 4,034,336 A | 7/1977 | Arai |
| 4,404,639 A | 9/1983 | McGuire |
| 4,497,057 A | 1/1985 | Kato et al. |
| 4,989,146 A | 1/1991 | Imajo |
| 4,992,947 A | 2/1991 | Nimura et al. |
| 5,157,714 A | 10/1992 | Spicer |
| 5,173,691 A | 12/1992 | Sumner |
| 5,182,555 A | 1/1993 | Sumner |
| 5,220,507 A | 6/1993 | Kirson |
| 5,257,023 A | 10/1993 | Furuya |
| 5,359,529 A | 10/1994 | Snider |
| 5,369,588 A | 11/1994 | Hayami et al. |
| 5,388,045 A | 2/1995 | Kamiya et al. |
| 5,420,794 A | 5/1995 | James |
| 5,442,553 A | 8/1995 | Parrillo |
| 5,445,347 A | 8/1995 | Ng |
| 5,506,773 A | 4/1996 | Takaba et al. |

(Continued)

FOREIGN PATENT DOCUMENTS

EP 0973299 1/2000
(Continued)

OTHER PUBLICATIONS

Mayerson, Norman; "Customizing a Vehicle's Electronic Functions wll be as Simple as Downloading Software from the Internet", Aug. 1999, Al, pp. 40-41.*

(Continued)

*Primary Examiner* — John Hayes
*Assistant Examiner* — Freda A Nelson
(74) *Attorney, Agent, or Firm* — Plumsea Law Group, LLC

(57) ABSTRACT

Methods and systems are provided for the analysis of one or more diagnostic trouble codes (DTCs), and for the scheduling of vehicle service appointments based at least in part on the DTC analysis. The method involves analyzing the received DTCs to determine an underlying problem. Once the underlying problem is determined, the parts and estimated repair time needed to repair the problem is determined. In one approach, the selection of the proposed slot for the service appointment involves coordinating numerous factors, such as the availability of needed parts, the user's scheduling preferences, and the availability of slots in the dealer's service schedule.

20 Claims, 8 Drawing Sheets

U.S. PATENT DOCUMENTS

| | | | |
|---|---|---|---|
| 5,508,931 A | 4/1996 | Snider |
| 5,546,305 A | 8/1996 | Kondo |
| 5,551,064 A | 8/1996 | Nobbe et al. |
| 5,559,511 A | 9/1996 | Ito et al. |
| 5,563,788 A | 10/1996 | Yoon |
| 5,590,040 A | 12/1996 | Abe et al. |
| 5,635,924 A | 6/1997 | Tran et al. |
| 5,636,245 A | 6/1997 | Ernst et al. |
| 5,648,768 A | 7/1997 | Bouve |
| 5,649,300 A | 7/1997 | Snyder et al. |
| 5,661,787 A | 8/1997 | Pocock |
| 5,664,948 A | 9/1997 | Dimitriadis et al. |
| 5,671,195 A | 9/1997 | Lee |
| 5,682,525 A | 10/1997 | Bouve et al. |
| 5,696,676 A | 12/1997 | Takaba |
| 5,699,056 A | 12/1997 | Yoshida |
| 5,757,645 A | 5/1998 | Schneider et al. |
| 5,774,073 A | 6/1998 | Maekawa et al. |
| 5,774,827 A | 6/1998 | Smith et al. |
| 5,781,871 A | 7/1998 | Mezger et al. |
| 5,801,948 A | 9/1998 | Wood et al. |
| 5,802,545 A | 9/1998 | Coverdill |
| 5,818,356 A | 10/1998 | Schuessler |
| 5,862,510 A | 1/1999 | Saga et al. |
| 5,864,305 A | 1/1999 | Rosenquist |
| 5,878,056 A | 3/1999 | Black et al. |
| 5,892,463 A | 4/1999 | Hikita et al. |
| 5,911,773 A | 6/1999 | Mutsuga et al. |
| 5,926,108 A | 7/1999 | Wicks et al. |
| 5,928,307 A | 7/1999 | Oshizawa et al. |
| 5,931,878 A | 8/1999 | Chapin, Jr. |
| 5,959,577 A | 9/1999 | Fan et al. |
| 5,964,811 A | 10/1999 | Ishii et al. |
| 5,982,298 A | 11/1999 | Lappenbusch et al. |
| 5,999,882 A | 12/1999 | Simpson et al. |
| 6,032,046 A | 2/2000 | Nakano |
| 6,034,626 A | 3/2000 | Maekawa et al. |
| 6,061,629 A | 5/2000 | Yano et al. |
| 6,073,007 A | 6/2000 | Doyle |
| 6,078,865 A | 6/2000 | Koyanagi |
| 6,085,146 A | 7/2000 | Kuribayashi et al. |
| 6,101,443 A | 8/2000 | Kato et al. |
| 6,111,521 A | 8/2000 | Mulder et al. |
| 6,169,894 B1 | 1/2001 | McCormick et al. |
| 6,169,902 B1 | 1/2001 | Kawamoto |
| 6,195,602 B1 | 2/2001 | Hazama et al. |
| 6,208,935 B1 | 3/2001 | Yamada et al. |
| 6,212,388 B1 | 4/2001 | Seo |
| 6,212,483 B1 | 4/2001 | Carew et al. |
| 6,236,330 B1 | 5/2001 | Cohen |
| 6,240,364 B1 | 5/2001 | Kerner et al. |
| 6,240,369 B1 | 5/2001 | Foust |
| 6,243,647 B1 | 6/2001 | Berstis et al. |
| 6,246,320 B1 | 6/2001 | Monroe |
| 6,266,607 B1 | 7/2001 | Meis et al. |
| 6,266,608 B1 | 7/2001 | Pertz |
| 6,292,723 B1 | 9/2001 | Brogan et al. |
| 6,297,748 B1 | 10/2001 | Lappenbusch et al. |
| 6,298,423 B1 | 10/2001 | Johnson et al. |
| 6,308,120 B1 | 10/2001 | Good |
| 6,317,686 B1 | 11/2001 | Ran |
| 6,323,885 B1 | 11/2001 | Wiese |
| 6,329,925 B1 | 12/2001 | Skiver et al. |
| 6,330,499 B1 * | 12/2001 | Chou et al. ................... 701/33 |
| 6,335,729 B2 | 1/2002 | Nunokawa et al. |
| 6,339,736 B1 | 1/2002 | Moskowitz et al. |
| 6,351,709 B2 | 2/2002 | King et al. |
| 6,356,822 B1 | 3/2002 | Diaz et al. |
| 6,362,730 B2 | 3/2002 | Razavi et al. |
| 6,370,454 B1 * | 4/2002 | Moore ........................ 701/29 |
| 6,373,883 B1 | 4/2002 | Soerensen et al. |
| 6,381,533 B1 | 4/2002 | Crane et al. |
| 6,389,337 B1 | 5/2002 | Kolls |
| 6,392,565 B1 | 5/2002 | Brown |
| 6,397,067 B1 | 5/2002 | Tanaka et al. |
| 6,397,076 B1 | 5/2002 | Brown et al. |
| 6,405,129 B1 | 6/2002 | Yokota |
| 6,405,130 B1 | 6/2002 | Piwowarski |
| 6,408,307 B1 | 6/2002 | Semple et al. |
| 6,421,593 B1 | 7/2002 | Kempen et al. |
| 6,433,735 B1 | 8/2002 | Bloebaum et al. |
| 6,434,455 B1 | 8/2002 | Snow et al. |
| 6,438,490 B2 | 8/2002 | Ohta |
| 6,459,961 B1 | 10/2002 | Obradovich et al. |
| 6,477,452 B2 | 11/2002 | Good |
| 6,480,105 B2 | 11/2002 | Edwards |
| 6,480,145 B1 | 11/2002 | Hasegawa |
| 6,484,094 B1 | 11/2002 | Wako |
| 6,510,317 B1 | 1/2003 | Marko et al. |
| 6,519,528 B2 | 2/2003 | Endo et al. |
| 6,522,250 B1 | 2/2003 | Ernst et al. |
| 6,526,335 B1 | 2/2003 | Treyz et al. |
| 6,529,143 B2 | 3/2003 | Mikkola et al. |
| 6,539,269 B1 | 3/2003 | Jarrow et al. |
| 6,539,302 B1 | 3/2003 | Bender et al. |
| 6,542,794 B2 | 4/2003 | Obradovich |
| 6,542,814 B2 | 4/2003 | Polidi et al. |
| 6,542,822 B1 | 4/2003 | Froeberg |
| 6,549,833 B2 | 4/2003 | Katagishi et al. |
| 6,552,682 B1 | 4/2003 | Fan |
| 6,553,289 B2 | 4/2003 | Maki et al. |
| 6,553,290 B1 | 4/2003 | Pillar |
| 6,553,308 B1 | 4/2003 | Uhlmann et al. |
| 6,553,313 B1 | 4/2003 | Froeberg |
| 6,577,934 B2 | 6/2003 | Matsunaga et al. |
| 6,583,734 B2 | 6/2003 | Bates et al. |
| 6,587,759 B2 | 7/2003 | Obradovich et al. |
| 6,587,777 B1 | 7/2003 | St. Pierre |
| 6,587,787 B1 | 7/2003 | Yokota |
| 6,590,507 B2 | 7/2003 | Burns |
| 6,594,576 B2 | 7/2003 | Fan et al. |
| 6,597,904 B1 | 7/2003 | Neustein |
| 6,603,405 B2 | 8/2003 | Smith |
| 6,604,038 B1 | 8/2003 | Lesesky et al. |
| 6,609,004 B1 | 8/2003 | Morse et al. |
| 6,609,050 B2 | 8/2003 | Li |
| 6,611,201 B1 | 8/2003 | Bishop et al. |
| 6,611,740 B2 | 8/2003 | Lowrey et al. |
| 6,611,753 B1 | 8/2003 | Millington |
| 6,611,755 B1 | 8/2003 | Coffee et al. |
| 6,615,130 B2 | 9/2003 | Myr |
| 6,615,133 B2 | 9/2003 | Boies et al. |
| 6,615,186 B1 | 9/2003 | Kolls |
| 6,618,669 B2 | 9/2003 | Ota et al. |
| 6,633,238 B2 | 10/2003 | Lemelson et al. |
| 6,636,721 B2 | 10/2003 | Threadgill et al. |
| 6,647,417 B1 | 11/2003 | Hunter et al. |
| 6,654,600 B1 | 11/2003 | Pollak et al. |
| 6,657,558 B2 | 12/2003 | Horita et al. |
| 6,658,485 B1 | 12/2003 | Baber et al. |
| 6,662,090 B2 | 12/2003 | Toyama et al. |
| 6,662,091 B2 | 12/2003 | Wilson et al. |
| 6,664,922 B1 | 12/2003 | Fan |
| 6,668,219 B2 | 12/2003 | Hwang et al. |
| 6,677,854 B2 * | 1/2004 | Dix ............................ 340/438 |
| 6,680,694 B1 | 1/2004 | Knockeart et al. |
| 6,681,120 B1 | 1/2004 | Kim |
| 6,691,025 B2 | 2/2004 | Reimer |
| 6,697,633 B1 | 2/2004 | Dogan et al. |
| 6,701,231 B1 | 3/2004 | Borugian |
| 6,701,232 B2 | 3/2004 | Yamaki |
| 6,707,421 B1 | 3/2004 | Drury et al. |
| 6,711,398 B1 | 3/2004 | Talaie et al. |
| 6,711,474 B1 * | 3/2004 | Treyz et al. ................... 701/1 |
| 6,714,797 B1 | 3/2004 | Rautila |
| 6,720,920 B2 | 4/2004 | Breed et al. |
| 6,721,685 B2 | 4/2004 | Kodama |
| 6,724,827 B1 | 4/2004 | Patsiokas et al. |
| 6,730,940 B1 | 5/2004 | Steranka et al. |
| 6,732,031 B1 | 5/2004 | Lightner et al. |
| 6,735,416 B1 | 5/2004 | Marko et al. |
| 6,735,504 B2 | 5/2004 | Katagishi et al. |
| 6,738,697 B2 | 5/2004 | Breed |
| 6,741,188 B1 | 5/2004 | Miller et al. |
| 6,741,834 B1 | 5/2004 | Godwin |
| 6,741,856 B2 | 5/2004 | McKenna et al. |
| 6,745,151 B2 | 6/2004 | Marko et al. |

| | | |
|---|---|---|
| 6,748,317 B2 | 6/2004 | Maruyama et al. |
| 6,754,485 B1 | 6/2004 | Obradovich et al. |
| 6,754,570 B2 | 6/2004 | Iihoshi et al. |
| 6,756,999 B2 | 6/2004 | Stoakley et al. |
| 6,757,712 B1 | 6/2004 | Bastian et al. |
| 6,785,551 B1 | 8/2004 | Richard |
| 6,798,358 B2 | 9/2004 | Joyce et al. |
| 6,804,490 B2 | 10/2004 | Cook et al. |
| 6,804,589 B2 | 10/2004 | Foxford et al. |
| 6,807,469 B2 * | 10/2004 | Funkhouser et al. ............ 701/33 |
| 6,810,323 B1 | 10/2004 | Bullock et al. |
| 6,812,860 B1 | 11/2004 | Schwarzwalder, Jr. |
| 6,812,888 B2 | 11/2004 | Drury et al. |
| 6,813,549 B2 | 11/2004 | Good |
| 6,816,778 B2 | 11/2004 | Diaz |
| 6,819,986 B2 | 11/2004 | Hong et al. |
| 6,823,169 B2 | 11/2004 | Marko et al. |
| 6,823,263 B1 | 11/2004 | Kelly et al. |
| 6,829,532 B2 | 12/2004 | Obradovich et al. |
| 6,836,539 B2 | 12/2004 | Katou et al. |
| 6,836,667 B1 | 12/2004 | Smith, Jr. |
| 6,839,628 B1 | 1/2005 | Tu |
| 6,847,871 B2 | 1/2005 | Malik et al. |
| 6,847,872 B2 | 1/2005 | Bodin et al. |
| 6,847,889 B2 | 1/2005 | Park et al. |
| 6,850,823 B2 | 2/2005 | Eun et al. |
| 6,856,901 B2 | 2/2005 | Han |
| 6,859,720 B2 | 2/2005 | Satoh et al. |
| 6,865,480 B2 | 3/2005 | Wong |
| 6,870,487 B2 | 3/2005 | Nuesser et al. |
| 6,871,067 B2 | 3/2005 | Clark et al. |
| 6,882,931 B2 | 4/2005 | Inoue |
| 6,901,374 B1 | 5/2005 | Himes |
| 6,909,944 B2 | 6/2005 | Pillar et al. |
| 6,911,918 B2 | 6/2005 | Chen |
| 6,920,382 B2 | 7/2005 | Katagishi et al. |
| 6,922,629 B2 | 7/2005 | Yoshikawa et al. |
| 6,928,423 B1 | 8/2005 | Yamanaka |
| 6,944,430 B2 | 9/2005 | Berstis |
| 6,950,649 B2 | 9/2005 | Videtich |
| 6,971,070 B2 | 11/2005 | Obradovich et al. |
| 6,983,200 B2 | 1/2006 | Bodin et al. |
| 6,987,964 B2 | 1/2006 | Obradovich et al. |
| 6,988,034 B1 | 1/2006 | Marlatt et al. |
| 6,993,421 B2 | 1/2006 | Pillar et al. |
| 6,995,686 B2 | 2/2006 | Gosdin et al. |
| 7,006,903 B2 | 2/2006 | Smith et al. |
| 7,010,297 B2 | 3/2006 | Yokota |
| 7,016,774 B2 * | 3/2006 | Barber et al. .................. 701/30 |
| 7,023,332 B2 | 4/2006 | Saito et al. |
| 7,031,832 B2 | 4/2006 | Kawasaki et al. |
| 7,082,359 B2 | 7/2006 | Breed |
| 7,124,004 B2 | 10/2006 | Obradovich |
| 7,170,390 B2 | 1/2007 | Quinones et al. |
| 7,174,301 B2 | 2/2007 | Florance et al. |
| 7,184,866 B2 | 2/2007 | Squires et al. |
| 7,188,073 B1 * | 3/2007 | Tam et al. ......................... 705/9 |
| 7,210,142 B2 | 4/2007 | Hilt et al. |
| 7,216,109 B1 | 5/2007 | Donner |
| 7,292,848 B2 | 11/2007 | Mazzara et al. |
| 7,307,513 B2 | 12/2007 | Shutter et al. |
| 7,376,497 B2 * | 5/2008 | Chen ............................. 701/29 |
| 7,415,243 B2 | 8/2008 | Yuhara et al. |
| 7,590,381 B2 | 9/2009 | Zink et al. |
| 7,617,028 B2 * | 11/2009 | Kelly et al. ..................... 701/30 |
| 7,643,788 B2 | 1/2010 | Habaguchi et al. |
| 7,797,170 B2 * | 9/2010 | Bodin ............................ 705/1.1 |
| 7,965,992 B2 | 6/2011 | Habaguchi et al. |
| 2001/0001848 A1 | 5/2001 | Oshizawa et al. |
| 2002/0002534 A1 | 1/2002 | Davis et al. |
| 2002/0016655 A1 | 2/2002 | Joao |
| 2002/0029339 A1 | 3/2002 | Rowe |
| 2002/0032507 A1 | 3/2002 | Diaz et al. |
| 2002/0044049 A1 | 4/2002 | Saito et al. |
| 2002/0049531 A1 | 4/2002 | Tanaka et al. |
| 2002/0049535 A1 * | 4/2002 | Rigo et al. ..................... 701/211 |
| 2002/0065605 A1 | 5/2002 | Yokota |
| 2002/0067289 A1 | 6/2002 | Smith |
| 2002/0072378 A1 | 6/2002 | Gaal |
| 2002/0073012 A1 | 6/2002 | Lowell et al. |
| 2002/0077741 A1 | 6/2002 | Hanebrink |
| 2002/0080022 A1 | 6/2002 | Edwards |
| 2002/0087237 A1 | 7/2002 | Ol et al. |
| 2002/0103582 A1 | 8/2002 | Ohmura et al. |
| 2002/0103583 A1 | 8/2002 | Ohmura et al. |
| 2002/0103597 A1 | 8/2002 | Takayama et al. |
| 2002/0130906 A1 | 9/2002 | Miyaki |
| 2002/0138196 A1 | 9/2002 | Polidi et al. |
| 2002/0152021 A1 | 10/2002 | Ota et al. |
| 2002/0152115 A1 | 10/2002 | Morita et al. |
| 2002/0156692 A1 | 10/2002 | Squeglia |
| 2002/0161495 A1 | 10/2002 | Yamaki |
| 2002/0161496 A1 | 10/2002 | Yamaki |
| 2002/0161841 A1 | 10/2002 | Kinnunen |
| 2002/0165662 A1 | 11/2002 | Maruyama et al. |
| 2002/0165665 A1 | 11/2002 | Kim |
| 2002/0176494 A1 | 11/2002 | Zhao et al. |
| 2002/0177926 A1 | 11/2002 | Lockwood et al. |
| 2002/0183059 A1 | 12/2002 | Noreen et al. |
| 2002/0193923 A1 | 12/2002 | Toyama et al. |
| 2002/0193926 A1 | 12/2002 | Katagishi et al. |
| 2002/0198632 A1 | 12/2002 | Breed et al. |
| 2002/0198637 A1 | 12/2002 | Shibata |
| 2003/0001736 A1 | 1/2003 | Lewis |
| 2003/0028297 A1 | 2/2003 | Iihoshi et al. |
| 2003/0051239 A1 | 3/2003 | Hudspeth |
| 2003/0063628 A1 | 4/2003 | Marko et al. |
| 2003/0069683 A1 | 4/2003 | Lapidot et al. |
| 2003/0081587 A1 | 5/2003 | Ichiyoshi |
| 2003/0083813 A1 | 5/2003 | Park |
| 2003/0093476 A1 | 5/2003 | Syed |
| 2003/0095038 A1 | 5/2003 | Dix |
| 2003/0098782 A1 | 5/2003 | Eastman et al. |
| 2003/0109972 A1 | 6/2003 | Tak |
| 2003/0117982 A1 | 6/2003 | Minnick |
| 2003/0158640 A1 | 8/2003 | Pillar et al. |
| 2003/0167110 A1 | 9/2003 | Smith et al. |
| 2003/0167120 A1 | 9/2003 | Kawasaki |
| 2003/0169182 A1 | 9/2003 | Wilhelm et al. |
| 2003/0182034 A1 | 9/2003 | Katagishi et al. |
| 2003/0182052 A1 | 9/2003 | DeLorme et al. |
| 2003/0191583 A1 | 10/2003 | Uhlmann et al. |
| 2003/0195695 A1 | 10/2003 | Maruyama et al. |
| 2003/0195814 A1 | 10/2003 | Striemer |
| 2003/0216859 A1 | 11/2003 | Martell et al. |
| 2003/0220835 A1 | 11/2003 | Barnes, Jr. |
| 2003/0225516 A1 | 12/2003 | DeKock et al. |
| 2003/0229441 A1 | 12/2003 | Pechatnikov et al. |
| 2003/0236600 A1 * | 12/2003 | Silvester ......................... 701/29 |
| 2003/0236613 A1 | 12/2003 | Satoh et al. |
| 2004/0012501 A1 | 1/2004 | Mazzara et al. |
| 2004/0024753 A1 | 2/2004 | Chane et al. |
| 2004/0044605 A1 | 3/2004 | Kress Bodin et al. |
| 2004/0048622 A1 | 3/2004 | Witkowski et al. |
| 2004/0059613 A1 | 3/2004 | Ford et al. |
| 2004/0059618 A1 | 3/2004 | Ford et al. |
| 2004/0059781 A1 | 3/2004 | Yoakum et al. |
| 2004/0068362 A1 | 4/2004 | Maekawa et al. |
| 2004/0068364 A1 | 4/2004 | Zhao et al. |
| 2004/0073356 A1 | 4/2004 | Craine |
| 2004/0075774 A1 | 4/2004 | Chang et al. |
| 2004/0080430 A1 | 4/2004 | Videtich et al. |
| 2004/0085198 A1 | 5/2004 | Saito et al. |
| 2004/0093155 A1 | 5/2004 | Simonds et al. |
| 2004/0093243 A1 | 5/2004 | Bodin |
| 2004/0093299 A1 | 5/2004 | Bodin et al. |
| 2004/0098195 A1 | 5/2004 | Listle et al. |
| 2004/0102898 A1 | 5/2004 | Yokota et al. |
| 2004/0104842 A1 | 6/2004 | Drury et al. |
| 2004/0110515 A1 | 6/2004 | Blumberg et al. |
| 2004/0148099 A1 | 7/2004 | Kim |
| 2004/0150534 A1 | 8/2004 | Linn |
| 2004/0167707 A1 | 8/2004 | Bragansa et al. |
| 2004/0192189 A1 | 9/2004 | Yuhara et al. |
| 2004/0198217 A1 | 10/2004 | Lee et al. |
| 2004/0199412 A1 * | 10/2004 | McCauley ......................... 705/7 |
| 2004/0203379 A1 | 10/2004 | Witkowski et al. |
| 2004/0203630 A1 | 10/2004 | Wang |

| | | |
|---|---|---|
| 2004/0204821 A1 | 10/2004 | Tu |
| 2004/0204842 A1 | 10/2004 | Shinozaki |
| 2004/0208204 A1 | 10/2004 | Crinon |
| 2004/0225437 A1 | 11/2004 | Endo et al. |
| 2004/0233070 A1 | 11/2004 | Finnern |
| 2004/0233101 A1 | 11/2004 | Kim |
| 2004/0239531 A1 | 12/2004 | Adamczyk |
| 2004/0243306 A1 | 12/2004 | Han |
| 2004/0249529 A1 | 12/2004 | Kelly et al. |
| 2004/0249530 A1 | 12/2004 | Kelly et al. |
| 2004/0249531 A1 | 12/2004 | Kelly et al. |
| 2004/0249532 A1 | 12/2004 | Kelly et al. |
| 2004/0249568 A1 | 12/2004 | Endo et al. |
| 2004/0252197 A1 | 12/2004 | Fraley et al. |
| 2004/0254723 A1 | 12/2004 | Tu |
| 2004/0260465 A1 | 12/2004 | Tu |
| 2004/0260786 A1 | 12/2004 | Barile |
| 2005/0001743 A1 | 1/2005 | Haemerle |
| 2005/0015186 A1 | 1/2005 | Kelly et al. |
| 2005/0015199 A1 | 1/2005 | Lokshin et al. |
| 2005/0021197 A1 | 1/2005 | Zimmerman et al. |
| 2005/0021199 A1 | 1/2005 | Zimmerman et al. |
| 2005/0027436 A1 | 2/2005 | Yoshikawa et al. |
| 2005/0027449 A1 | 2/2005 | Marsh |
| 2005/0033511 A1 | 2/2005 | Pechatnikov et al. |
| 2005/0038581 A1 | 2/2005 | Kapolka et al. |
| 2005/0038596 A1 | 2/2005 | Yang et al. |
| 2005/0043880 A1 | 2/2005 | Yamane et al. |
| 2005/0046615 A1 | 3/2005 | Han |
| 2005/0060070 A1 | 3/2005 | Kapolka et al. |
| 2005/0065678 A1 | 3/2005 | Smith et al. |
| 2005/0068174 A1 | 3/2005 | Oesterling et al. |
| 2005/0075095 A1 | 4/2005 | Dillon |
| 2005/0080519 A1 | 4/2005 | Oesterling et al. |
| 2005/0090951 A1 | 4/2005 | Good |
| 2005/0096811 A1 | 5/2005 | Bodin et al. |
| 2005/0096842 A1 | 5/2005 | Tashiro |
| 2005/0102102 A1 | 5/2005 | Linn |
| 2005/0125117 A1 | 6/2005 | Breed |
| 2005/0131626 A1 | 6/2005 | Ignatin |
| 2005/0137763 A1 | 6/2005 | Watkins et al. |
| 2005/0137790 A1 | 6/2005 | Yamada et al. |
| 2005/0140524 A1 | 6/2005 | Kato et al. |
| 2005/0143882 A1 | 6/2005 | Umezawa |
| 2005/0176482 A1 | 8/2005 | Raisinghani et al. |
| 2005/0222751 A1 | 10/2005 | Uyeki |
| 2005/0222760 A1 | 10/2005 | Cabral et al. |
| 2005/0222761 A1 | 10/2005 | Uyeki et al. |
| 2005/0222762 A1 | 10/2005 | Hamilton et al. |
| 2005/0222763 A1 | 10/2005 | Uyeki et al. |
| 2005/0222764 A1 | 10/2005 | Uyeki et al. |
| 2005/0273218 A1 | 12/2005 | Breed et al. |
| 2005/0288856 A1 | 12/2005 | Uyeki et al. |
| 2006/0038674 A1 | 2/2006 | Sumcad et al. |
| 2006/0046649 A1 | 3/2006 | Videtich |
| 2006/0047415 A1 | 3/2006 | Groskreutz et al. |
| 2006/0055565 A1 | 3/2006 | Kawamata et al. |
| 2006/0116800 A1 | 6/2006 | Obradovich et al. |
| 2006/0247832 A1 | 11/2006 | Taki |
| 2006/0253235 A1 | 11/2006 | Bi et al. |
| 2007/0005202 A1 | 1/2007 | Breed |
| 2007/0093947 A1* | 4/2007 | Gould et al. .................... 701/29 |
| 2008/0088480 A1 | 4/2008 | Rozum et al. |
| 2008/0106436 A1 | 5/2008 | Breed |
| 2010/0060481 A1 | 3/2010 | Habaguchi et al. |

FOREIGN PATENT DOCUMENTS

| | | |
|---|---|---|
| JP | 6276056 | 9/1994 |
| JP | 8149029 | 6/1996 |
| JP | 10054727 | 2/1998 |
| JP | 10150477 | 6/1998 |
| JP | 2000201104 | 7/2000 |
| JP | 2000293788 | 10/2000 |
| JP | 2001168743 | 6/2001 |
| JP | 2001216555 | 8/2001 |
| JP | 2002032276 | 1/2002 |
| JP | 2002077295 | 3/2002 |
| JP | 2002084298 | 3/2002 |
| JP | 2002318844 | 10/2002 |
| JP | 2003022330 | 1/2003 |
| JP | 2006003961 | 1/2006 |

OTHER PUBLICATIONS

Reynolds and Reynolds' Award-Winning Networkcar™ Solution Now Available at JM Lexus, Sep. 9, 2003; PR Newswire (US).*

Martin, Norman; "Getting on Board", May 1996, Automotive Industries, v176, n5, p. 71(2), 3 pgs.*

Office Action mailed Dec. 22, 2010 in U.S. Appl. No. 11/876,758.

Irwin M. Jacobs, "The Application of a Novel Two-Way Mobile Satellite Communications and Vehicle Tracking System to the Transportation Industry," IEEE Transactions on Vehicular Technology, vol. 40, No. 1, pp. 57-63, Feb. 1991.

Acidus, "The Flawed Future of Radio," 2600 Magazine, Jan. 15, 2003.

"Sirius Satellite Radio—Help," Archive.org, Oct. 6, 2002.

* cited by examiner

METHOD AND SYSTEM FOR VEHICLE SERVICE APPOINTMENTS BASED ON DIAGNOSTIC TROUBLE CODES

BACKGROUND OF THE INVENTION

1. Field of the Invention

The present invention relates to a method and system for scheduling vehicle service appointments. More specifically, the present invention provides a method and system for detecting a triggering event, analyzing combinations of diagnostic trouble codes (DTCs), and scheduling a vehicle service appointment based on the DTC analysis.

2. Description of Related Art

Existing methods and systems for the upkeep and maintenance of vehicles are limited in their ability to inform customers/users about recommended vehicle service. Examples of existing service/maintenance information systems include warning lights that are activated upon the detection of certain conditions, such as low oil levels, etc. Users sometimes observe such preprogrammed notices, but do not comprehend the significance of the notices and/or how soon they should take their vehicles in for service. Moreover, because such systems are based on preprogrammed maintenance conditions or schedules, they are particularly limited in their ability to notify vehicle users about subsequent developments, such as car part/product recall notices or the development of improved or updated parts to be used in their vehicles.

What is needed is an automated system and method for coordinating the scheduling of vehicle service appointments at dealers or authorized service providers, while taking into consideration diagnostic trouble codes (DTCs).

SUMMARY OF THE INVENTION

The present invention addresses the shortcomings of the prior art systems and methods. In particular, the present invention is directed to a method and system for analyzing diagnostic trouble codes (DTCs) and scheduling vehicle service appointments based at least in part on the analysis of the DTCs.

For routine service work, such as oil and brake maintenance services, the dealer often has the needed parts (e.g., oil filters, brake pads, etc.) in its inventory. For specialized service, however, the dealer may not have the needed parts in stock, which can delay the service time or cause the customer to make a subsequent trip to the dealer when the parts become available. One aspect of the exemplary methods described herein comprises coordinating the scheduling of vehicle service appointments by considering the availability of needed parts. The method involves initiating contact with the user to provide the user with one or more proposed appointment day/time slots. By coordinating the various factors explained above, the method and system described herein make it possible to better ensure vehicle repair, reduce the need for multiple visits to the dealer, improve the effectiveness of product update campaigns, proactively fill available dealer service bays, and thereby improve both customer service and the utilization of dealer service capacity.

In accordance with one aspect of the embodiments described herein, there is provided an onboard system for scheduling a vehicle service appointment, comprising: a sensor for detecting a trigger event; a transmitter; a receiver; a processor module operatively coupled to the sensor, the transmitter, and the receiver; and a memory module operatively coupled to the processor module. The memory module comprises executable code for the processor module to: generate one or more DTCs in response to the detected trigger event; analyze the DTCs to determine an underlying problem; and command the transmitter to transmit an appointment request and information regarding the DTCs to an appointment scheduling center. The receiver receives a proposed date/time slot from the appointment scheduling center.

In accordance with another aspect of the embodiments described herein, there is provided an off-board system for scheduling a vehicle service appointment, comprising: a transmitter; a receiver adapted to receive one or more DTCs from a vehicle; a processor module operatively coupled to the transmitter and the receiver; and a memory module operatively coupled to the processor module. The memory module comprises executable code for the processor module to: analyze the received DTCs to determine an underlying problem; determine parts needed to repair the underlying problem; estimate time needed to repair the underlying problem; identify a servicing dealer; and select a proposed date/time slot for the service appointment with the identified servicing dealer based at least in part on the parts and the estimated time needed to repair the underlying problem. The transmitter transmits the proposed date/time slot to the vehicle.

In accordance with another aspect of the embodiments described herein, there is provided a method for scheduling a service appointment for a vehicle, comprising: detecting a trigger event; generating one or more DTCs in response to the detected trigger event; analyzing the DTCs to determine an underlying problem; transmitting an appointment request and information regarding the DTCs from the vehicle to an appointment scheduling center; and receiving a proposed date/time slot for the service appointment. This method would typically be utilized onboard the vehicle. In one embodiment, the detected trigger events results in the generation of a plurality of DTCs. In another embodiment, the detected trigger events results in the generation of a single DTC.

In accordance with another aspect of the embodiments described herein, there is provided a method for scheduling a service appointment for a vehicle, comprising: receiving one or more DTCs; analyzing the received DTCs to determine an underlying problem; determining parts needed to repair the underlying problem; estimating time needed to repair the underlying problem; identifying a servicing dealer; and selecting a proposed date/time slot for the service appointment with the identified servicing dealer based at least in part on the parts and the estimated time needed to repair the underlying problem. This method would typically be utilized off-board the vehicle. In one embodiment, a plurality of DTCs are received and analyzed. In another embodiment, a single DTC is received and analyzed.

A more complete understanding of the disclosed method and system for the scheduling of vehicle service appointments will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention generally relates to systems and methods for scheduling vehicle service appointments, typically in response to detected trigger events, vehicle part updates, etc. In particular, the present invention is directed to a system and method for proactively scheduling a vehicle service appointment by coordinating numerous factors, such as determining the underlying problem(s), availability of needed parts, the user's scheduling preferences, and the availability of day/time slots in the dealer's service schedule. In the detailed description that follows, like element numerals are used to describe like elements illustrated in one or more of the figures.

Figure 1A:
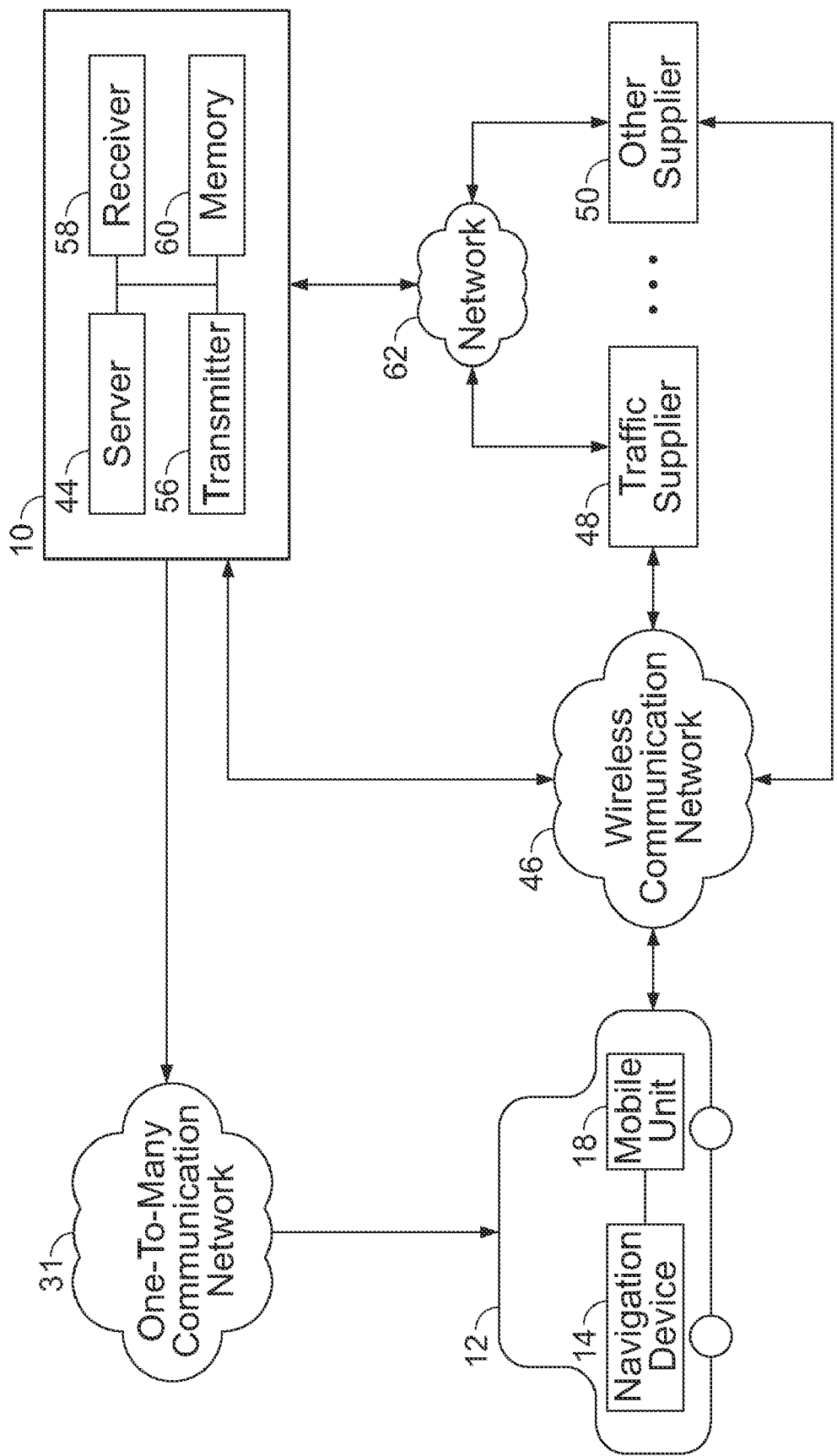
FIG. 1a is a schematic diagram of a first embodiment of a communication system pursuant to aspects of the invention.
Figure 1B:
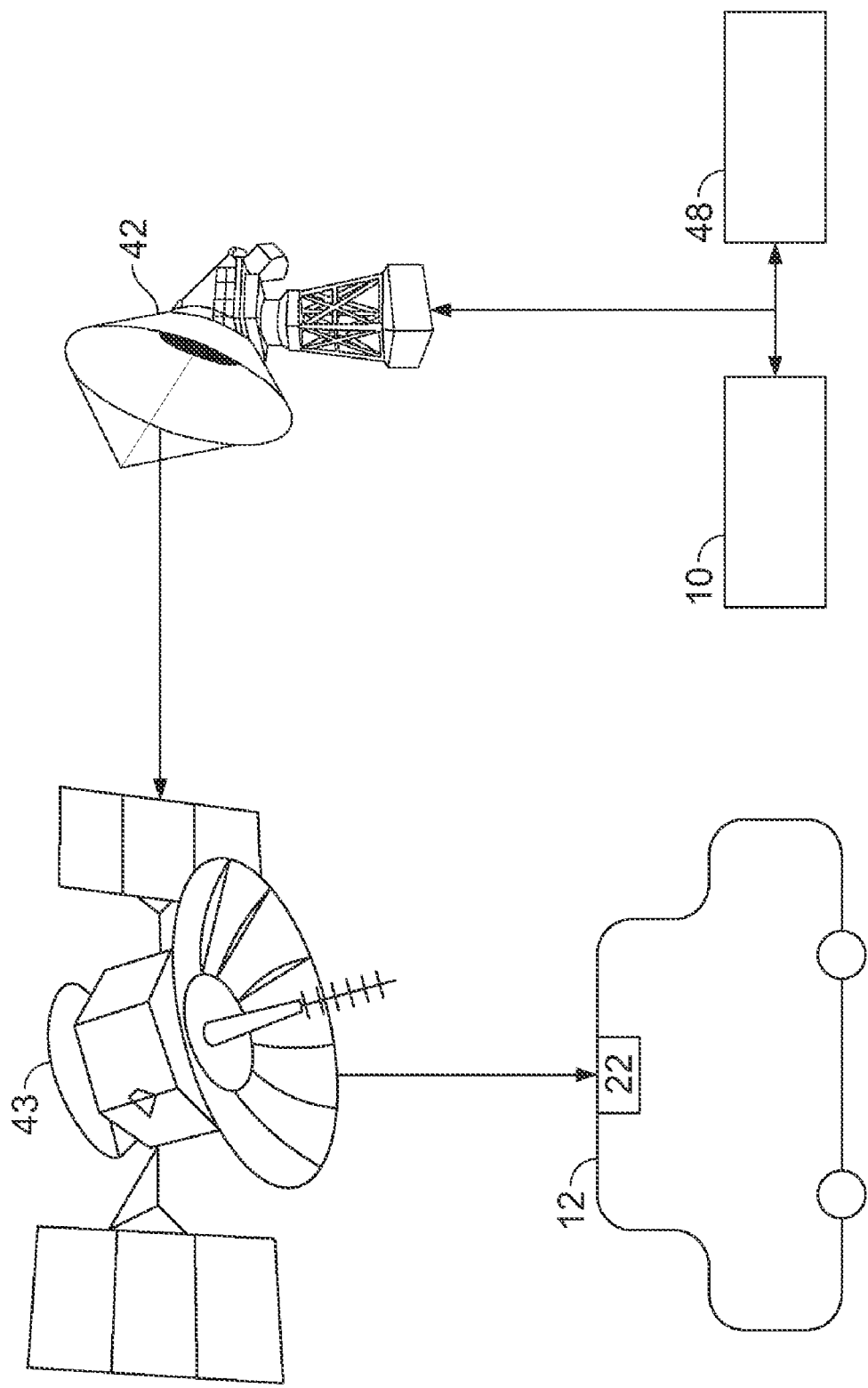
FIG. 1b is a schematic diagram of a broadcast communication network.
Figure 1C:
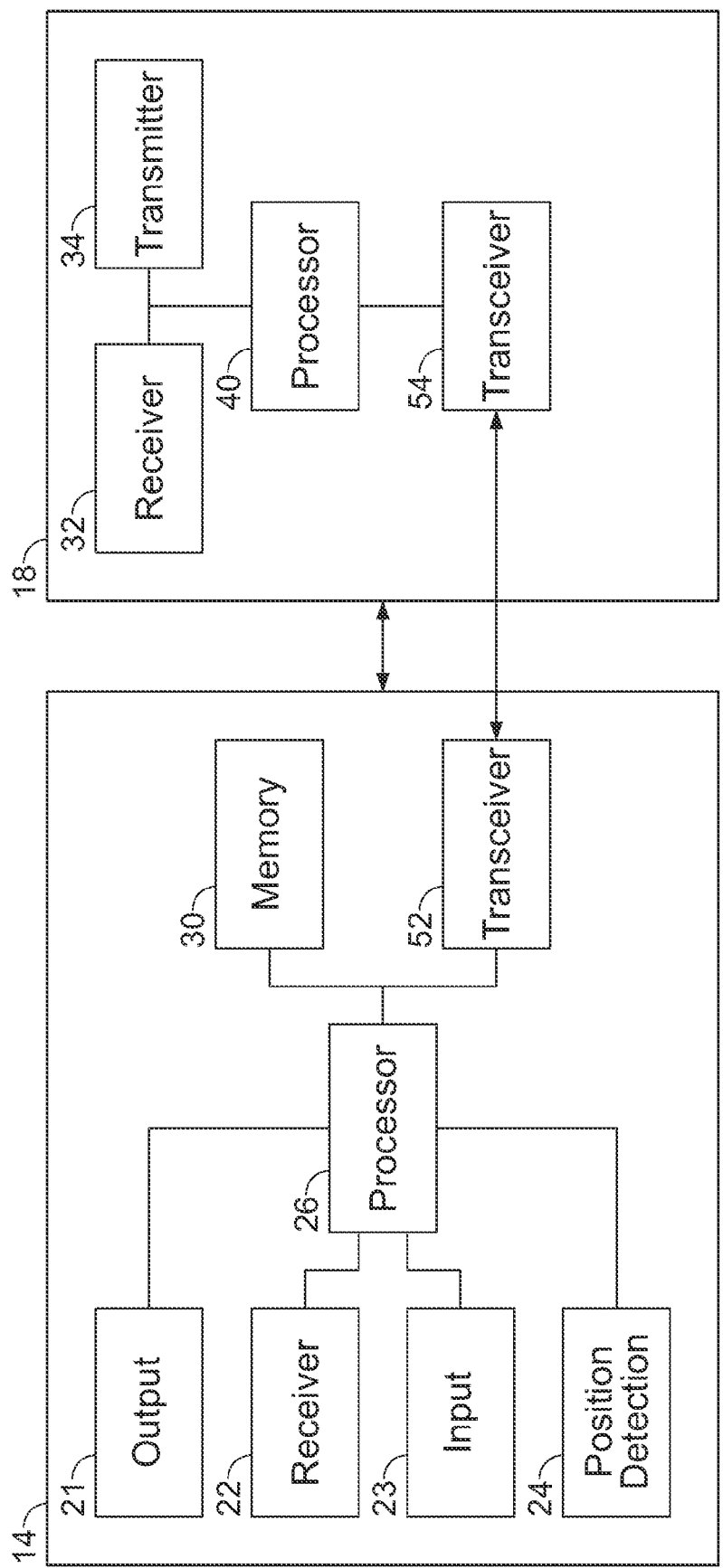
FIG. 1c is a schematic diagram of a navigation device in communication with a mobile unit.

With reference to FIG. 1a, there is provided a first embodiment of a system for the exchange of information between a remote location 10 and a vehicle 12 pursuant to aspects of the invention. The vehicle 12 includes a navigation device 14. Referring now also to FIG. 1c, the navigation device 14 may include an output unit 21, a receiver unit 22, an input unit 23, a position detection unit 24, a navigation memory unit 30, a navigation processor unit 26, and an RF transceiver unit 52 that are all in electrical communication with one another. The navigation memory unit 30 includes at least a portion of a user profile and in some embodiments may include the entire user profile. In addition, the navigation memory unit 30 includes a road map database portion and, in some embodiments, includes a disk reading unit for reading road map information not built into the navigation device 14. As is provided in greater detail below, the user profile and/or the road map database stored in the memory 30 may be updated in the vehicle by way of the input unit 23, which can include at least one of a keyboard, a touch sensitive display, and a microphone. The user profile and/or the road map database may also be updated by way of information received through the receiver unit 22 and/or the RF transceiver unit 52.

The receiver unit 22 receives information from the remote location 10 and, in one embodiment, is in communication with the remote location by way of a one-to-many communication system. One-to-many communication systems include systems that can send information from one source to a plurality of receivers, such as a broadcast network 31. Broadcast networks include television, radio, and satellite networks. Referring now to FIG. 1b, in one embodiment, the broadcast network 31 includes an SDARS or satellite radio (e.g., XM radio or Sirius radio) network 40, comprising broadcast towers 42, satellite servers (not shown), and satellites 43. The broadcast towers 42 transmit information to the satellites 43, which bounce the information back down to the receiver unit 22 of the navigation device 14.

Referring now back to FIG. 1a, the information received by the receiver 22 may be processed by the navigation processor unit 26. The processed information may then be displayed by way of the output unit 21, which includes at least one of a display and a speaker. In one embodiment, the receiver unit 22, the navigation processor unit 26 and the output unit 21 are provided access to only subsets of the received broadcast information based on user preferences and/or traffic information demands. The user preferences, as well as user identity information and traffic-related information, can be part of the user profile.

The position detection unit 24 may include a positioning receiver that communicates with a plurality of positioning satellites (e.g., GPS satellites), separate from the XM satellites, to determine the position of the vehicle 12. For example, in one embodiment, a GPS receiver searches for and collects GPS information or signals broadcast from four or more GPS satellites that are in view of the GPS receiver. Next, using the time interval between the broadcast time and reception time of each broadcast signal, the GPS receiver calculates the distance between the GPS receiver and each of the four or more GPS satellites. These distance measurements, along with the position and time information received in the broadcast signals, allow the GPS receiver to calculate the geographic position of the vehicle 12. It will be noted that the positioning technology suitable for the present invention is not limited to GPS technology; rather, the embodiments described herein that utilize GPS technology are merely exemplary.

Figure 2:
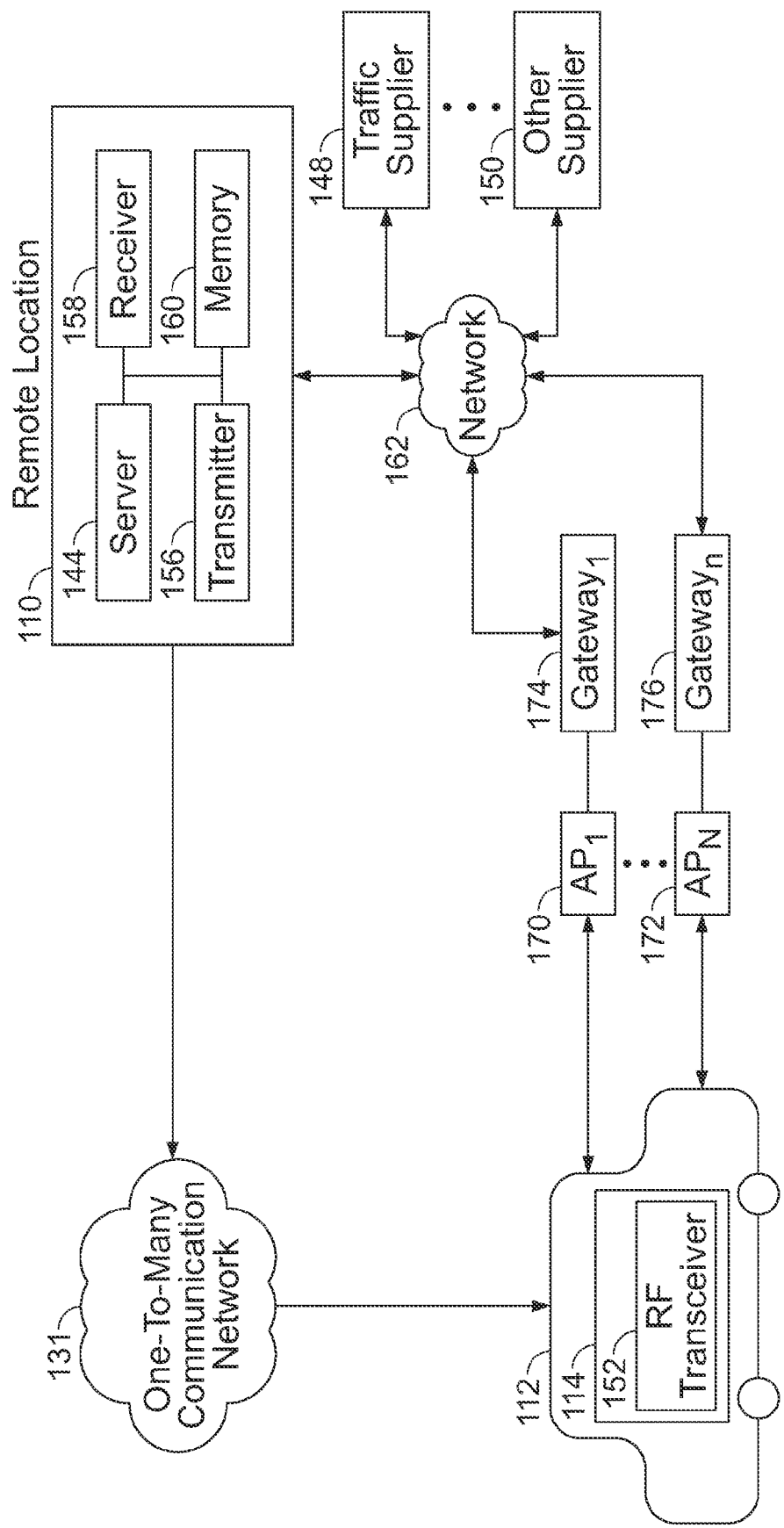
FIG. 2 is a schematic diagram of an alternate embodiment of a communication system.

In the embodiment shown in FIG. 1a, the mobile unit 18 is used to receive and transmit information from and to the remote location 10; and, in an alternate embodiment shown in FIG. 2, an RF transceiver 152 is used to receive and transmit information from and to the remote location 110. The mobile unit 18 may be a wireless phone or any other device that communicates with other devices by way of the wireless communication network 46. As shown in FIG. 1c, in one embodiment, the mobile unit 18 includes a wireless receiver 32, a wireless transmitter 34, a mobile unit processor 40, and an RF transceiver unit 54 that are in communication with one another. The mobile unit 18 is in two-way communication with the remote location 10 by way of the receiver 32, the transmitter 34, and the wireless communication network 46, which may comprise numerous base stations. In one embodiment, information is transmitted from or to the vehicle or remote location over a data channel of the wireless communication network 46 (e.g., a high bandwidth GPRS/1XRTT channel, a low bandwidth DTMF channel, etc.). The receiver 32 receives information from the remote location 10, and the transmitter 34 transmits information to the remote location 10. In other embodiments, the transmitter 34 also transmits information to suppliers of traffic or other information 48, 50.

In one embodiment, the information received from and transmitted to the remote location 10 by way of the mobile unit 18 is accessed by the user through the navigation device 14, which is in communication with the mobile unit 18. The mobile unit 18 may be embedded in the vehicle 12 and be in communication with the navigation device 14 by, for example, a cable (not shown).

In another embodiment, the navigation device 14 and mobile unit 18 are in communication with one another by way of RF transceiver units 54 and 52. Both the navigation device 14 and the mobile unit 18 include RF transceiver units 52, 54, which, in one embodiment, comply with the Bluetooth® wireless data communication format or the like. The RF transceiver units 52, 54 allow the navigation device 14 and the mobile unit 18 to communicate with one another. In other embodiments not shown, the receiver 32 and transmitter 14 of the mobile unit 18 and the receiver unit 20 of the navigation device 14 allow the navigation device 14 and mobile unit 18 to communicate with one another. In yet other embodiments, there may be an RF transceiver that is separate from the navigation device 14 and the mobile unit 18 and that allows the navigation device 14 and mobile unit 18 to communicate with one another.

In the alternate embodiment shown in FIG. 2, the navigation device 114 transmits and receives information to and from the remote location 110 by way of the RF transceiver 152, access points 170, 172, and gateways 174, 176 that are in communication with the network 162. In one embodiment, the RF transceiver 152 and the access points 170, 172 are compliant with the IEEE 802.11 specification, and such transceivers and access points include Wi-Fi®—certified equipment or DSRC/WAVE (802.11p). The access points 170, 172 are typically in communication with the gateways 174, 176 by way of a cable, and the gateways are in communication with the remote location 110 by way of the network 162. The access points 170, 172 are in communication with the RF transceiver 152 and have a limited range over which they can communicate with the RF transceiver 152. Thus, it is preferable that there be numerous access points 170, 172 positioned so that the distance between the access points and the areas through which a vehicle 12 might pass is less than or equal to the limited range of the access points or an altered mesh (e.g., 802.11g) or vehicle-to-vehicle or vehicle-to-infrastructure can be used. With access to such a suitable network, the RF transceiver 152 effectively exchanges information with the access points 170, 172 and, thus, the remote location 110.

Note that in the embodiment of FIG. 2, the navigation device 114 also includes input and output units, a receiver unit, a memory unit, and a processor unit, none of which are shown. The components of the alternate navigation device embodiment 114 have the same functionality as do the corresponding components of the navigation device 14 of the first embodiment.

The remote location 10, 110 includes a remote server 44, 144, a remote transmitter 56, 156 and receiver 58, 158, and a remote memory 60, 160 that are in communication with one another. As provided above, in the first embodiment, the remote transmitter and receiver 56, 58 communicate with the navigation device 14 and mobile unit 100 by way of the broadcast 31 and wireless 46 communication networks, respectively. In the alternate embodiment, the remote transmitter and receiver 156, 158 communicate with the navigation device 114, including the RF transceiver 152, by way of the broadcast communication network 131 and a network 162. The remote location 10, 110 is also in communication with suppliers of traffic and/or other information 48, 50, 148, 150 such as government traffic information suppliers, private traffic information suppliers, and users of other vehicles, by way of the network 62, 162.

In both the first and alternate embodiments shown in FIGS. 1a-1c and 2, respectively, the network 62, 162 is typically a wide area network (WAN) such as the Internet. In other embodiments, some of the information suppliers 48, 50, 148, 150, such as the government and private traffic information suppliers, may be in communication with the remote location 10, 110 by way of a local area network (LAN), while other information providers 48, 50, 148, 150 such as the vehicle users, are in communication with the remote location by way of the Internet. In yet other embodiments, the RF transceiver 152 is in communication with the remote location 110 and/or the information providers 148, 150 by way of a network 162 that is a LAN. In these other embodiments, the LAN 162 is compliant with the IEEE 802.3 specification or is an Ethernet network.

As provided in greater detail below, the information suppliers 48, 50, 148, 150 may transmit updated user profiles and traffic-related information to the remote location 10, 110. A plurality of user profiles are in a user profile database, which, along with traffic-related information, is stored in the remote memory 60, 160. The updated user profiles and new traffic-related information are transmitted from the remote location 10, 110 to the navigation device 14, 114 by way of the broadcast network 31, 131. In other embodiments, the new traffic-related information and updated user profiles may be transmitted to the vehicles 12, 112 by way of the wireless network 46 or the network 162. At the vehicle, the user profile stored in the memory 30 of the navigation device 14 is updated, and the vehicle-related information is made accessible to the user by way of the output unit 26 of the navigation device 14. In other embodiments, the information providers may communicate directly with the mobile unit 18 or RF transceiver 152 by way of the wireless communication network 46 or the network 162. Further details regarding embodiments of information exchange systems can be found in U.S. patent application Ser. No. 11/100,868, filed Apr. 6, 2005, titled "Method and System for Controlling the Exchange of Vehicle Related Messages," the disclosure of which is incorporated in its entirety herein by reference.

As explained above, in accordance with one aspect of the embodiments described herein, there is provided a system and method for proactively scheduling vehicle service appointments from the vehicle. The scheduling of service appointments is based in response to the detection of a trigger event on the vehicle, such as: a diagnostic trouble code (DTC) that notifies the user of issues with the vehicle; a maintenance minder (e.g., oil change or 30,000 mile service); product updates; or combinations thereof. When the trigger event comprises at least one DTC, the scheduling of service appointments is based on generating and/or receiving diagnostic trouble codes (DTCs), and analyzing one or more combinations of the DTCs to determine the underlying problem(s). The scheduling of service appointments can also be based in part on the user's scheduling preferences, available dealer appointment times, parts availability, and/or estimated time needed to repair vehicle issues or problems.

Figure 3A:
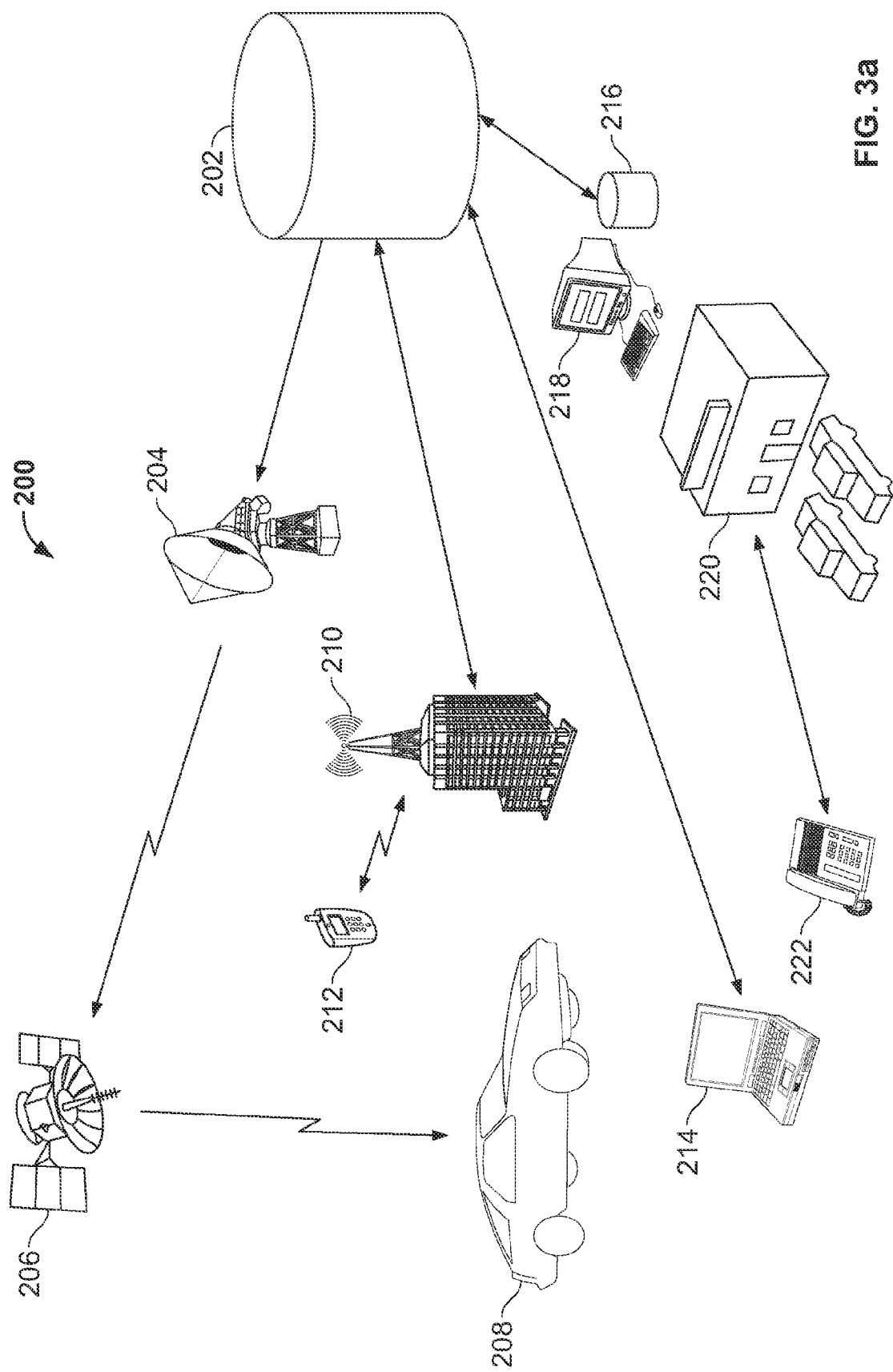
FIG. 3a is a schematic diagram of an embodiment of a system for coordinating the scheduling of a vehicle service appointment.

With reference to FIG. 3a, there is provided an embodiment of a system 200 for scheduling a vehicle service appointment based on factors, such as DTC analysis, product recall/update notices, customer/user preferences, available dealer appointment times, and/or parts availability. Subsets and different combinations of such factors can be considered in scheduling the service appointment. The system 200 comprises a server 202 that receives and processes information, such as DTCs, the availability of parts at the dealer, the dealer's service appointment schedule, the user's scheduling preferences, etc. The server 202 determines a proposed day and time to schedule the appointment. The criteria for determining the day/time of the appointment can vary according to the application or preferences of the user. In a preferred embodiment, the proposed appointment selected by the server 202 is the first available day/time at the dealer when the required parts are available, while satisfying the user's scheduling preferences.

The server 202 is in communication with a broadcast center 204, which is in turn in communication with one or more satellites 206 that relay the proposed appointment day/time as a broadcast message to a telematics unit in the customer's vehicle 208. In the present embodiment, the broadcast center 204 and the satellites 206 are part of a satellite radio broadcasting system (e.g., XM Satellite Radio). It will be understood that the proposed day/time can be broadcast via any suitable information broadcast system (e.g., FM radio, AM radio, or the like), and is not limited to the satellite radio broadcast system illustrated in FIG. 3a. In one embodiment, the telematics unit relays the proposed day/time to an onboard computer system, which in turn displays the proposed day/time on a display unit, such as the display unit associated with the vehicle's navigation system. In another embodiment, the proposed day/time for the appointment is provided to the customer via an audio message played on the vehicle's audio system.

In certain applications, such as when the vehicle trigger comprises a product update, proposed appointment day/time slots can be broadcast to multiple affected vehicle users in a given geographic region. In such a situation, it is generally preferable to transmit one or a few messages that comprises a plurality of 1-to-1 portions, as opposed to transmitting a separate message for each vehicle. Each 1-to-1 portion will typically be applicable to a single affected vehicle. In one embodiment, each 1-to-1 portion comprises a filter code section and a proposed appointment section. The filter code section can comprise a given affected vehicle's vehicle identification number (VIN) or another suitable vehicle identifier known in the art. The vehicle identifier will typically comprise information relating to the vehicle type, model year, mileage, sales zone, etc., as explained in further detail in U.S. patent application Ser. No. 11/232,311, filed Sep. 20, 2005, titled "Method and System for Broadcasting Data Messages to a Vehicle," the content of which is incorporated in its entirety into this disclosure by reference. The proposed appointment section can comprise information regarding the proposed appointment day/time slot for the affected vehicle.

Figure 3B:
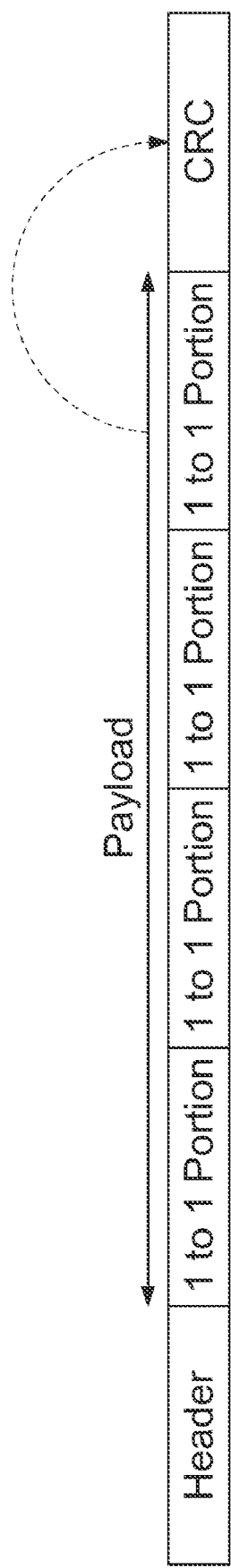
FIG. 3b is a block diagram of an embodiment of a multi-packet broadcast data message.

FIG. 3b provides a block diagram of an embodiment of a multi-packet broadcast data message containing 1-to-1 linked data regarding proposed appointment slots for the affected vehicles. The multi-packet broadcast data message includes a header, a payload section, and a CRC code. The payload section of the multi-packet broadcast data message contains a plurality of message portions. Each message portion is targeted to a single affected vehicle using the VIN number/code as the filter code section, and includes information regarding the proposed appointment day/time slot for the affected vehicle. The CRC code may be generated using any suitable algorithm, such as, the following polynomial $G(X)=X^{16}+X^{15}+X^2+1$. It will also be understood that the CRC code is merely exemplary, and that any other suitable method of checking for errors in the data message can be implemented with the present invention. Further detail regarding multi-packet broadcast data messages is provided in U.S. patent application Ser. No. 11/266,879, filed Nov. 4, 2005, titled "Data Broadcast Method for Traffic Information," the disclosure of which is incorporated in its entirety herein by reference.

With continued reference to FIG. 3a, the server 202 can also transmit the proposed appointment to a mobile or cellular communications provider, which in turn relays the proposed appointment to the customer's mobile phone 212 as a voicemail, text message, call from a live operator, etc. In one embodiment, a message regarding the product recall/update notice and the proposed appointment day/time is transmitted (e.g., via Bluetooth wireless data communication format or the like) from the user's mobile phone 212 to the vehicle's onboard computer system, which in turn displays the message of the vehicle's display unit and/or provides an auditory version of the message via the vehicle's audio system.

The server 202 can send the proposed appointment day/time in an email to the customer's email address. The customer can view, accept/reject the proposed day/time, and/or request another day/time via a reply email from his/her computer 214. Alternatively, the email can contain a link to a web site where the customer can view the proposed day/time, accept/reject the proposed day/time, and/or select another day/time from a list of available choices.

The server 202 can send the proposed appointment day/time to another database or server 216 that can be accessed via a computer 218 located at the dealer 220. Alternatively, the first server 202 can transmit raw data (e.g., trigger event data, parts availability, vehicle identification numbers of affected vehicles, customer data) to the second server 216, which determines the proposed appointment day/time. The dealer 220 can contact the customer with the proposed day/time for the vehicle service appointment by calling the user on a phone 222 or by using email, regular mail, etc.

In one embodiment, the server or the like comprises a receiver unit for receiving an information regarding the trigger event (e.g., product update notice) and a processor unit that is operatively coupled to the receiver unit, wherein the processor unit is programmed to: identify vehicles within a predefined geographic region that are affected by the trigger event; select a dealer located in the geographic region; verify that updated vehicle part is available at the dealer; and select a proposed appointment time slot for each identified vehicle. The system further comprises a transmitter unit that is operatively coupled to the processor unit for sending information regarding the proposed appointment slots to respective users of the identified vehicles. The processor unit can be programmed to select the proposed appointment time slot by: obtaining vehicle user's scheduling preferences; checking dealer's service appointment schedule; determining the estimated time needed to address the trigger event; and selecting as the proposed time slot the earliest available slot in the dealer's service appointment schedule that satisfies the vehicle user's scheduling preferences.

Figure 4:
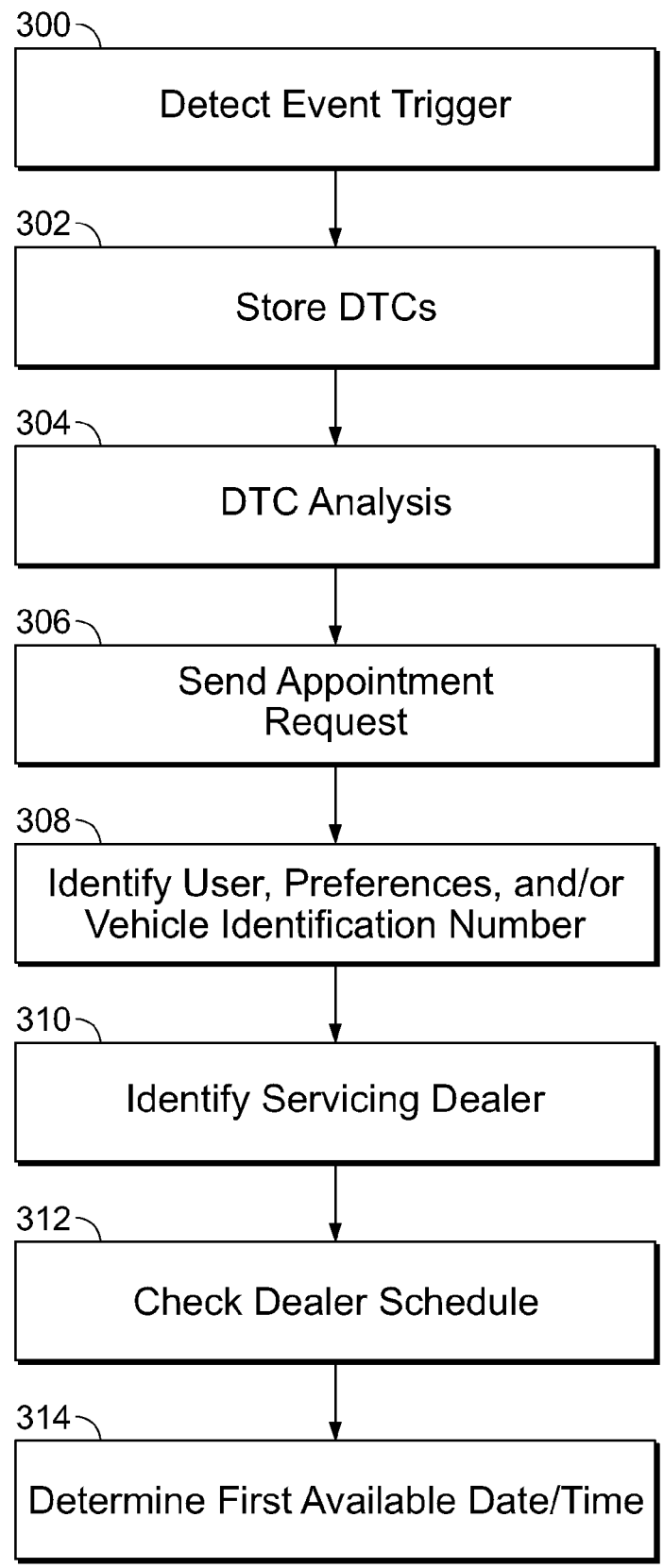
FIG. 4 outlines the steps of an exemplary onboard approach to scheduling vehicle service appointments via diagnostic trouble code analysis.

In accordance with another aspect of the embodiments described herein, there is provided a method for analyzing DTCs and scheduling vehicle service appointments in an automated manner. FIG. 4 illustrates an exemplary method for scheduling a service appointment, wherein the DTCs are analyzed onboard the vehicle. First, in step 300, a trigger event is detected. Typically, the trigger event comprises a DTC notifying the user of an issue with the vehicle, or the trigger event results in the generation of one or more DTCs in response to the detected trigger event. Upon detecting the trigger event and receiving and/or generating the DTCs, the method proceeds to step 302 which comprises storing the DTCs.

Step 304 comprises analyzing the DTCs. Each DTC typically corresponds to a detection item, such as the right-front wheel sensor or left-rear wheel sensor in association with vehicle stability assistance or control systems. Other examples of vehicle stability detection items for DTCs include the yaw rate sensor, lateral acceleration sensor, steering angle sensor, ABS solenoid, etc. The present invention is applicable to any known DTCs, such as those relating to engine performance and emissions, antilock brake systems, other onboard systems that are computer controlled, etc. Examples of DTCs and respective detection items for vehicle stability systems can include:

| DTC | Detection Item |
|---|---|
| 10 | Left-front wheel sensor |
| 11 | Yaw rate sensor |

| DTC | Detection Item |
|---|---|
| 14 | Lateral acceleration sensor |
| 15 | Longitude acceleration sensor |
| 20 | Steering angle sensor |
| ... | ... |

The DTCs are typically analyzed by referencing a table or database of DTCs, underlying vehicle issues/problems, parts needed, estimated time needed to address the underlying vehicle issues, etc. An exemplary table with combinations of DTCs, underlying issues, parts, and estimated time to repair is provided below:

| DTCs | Underlying issue | Parts Needed | Estimated Time |
|---|---|---|---|
| 7, 8, 9, 10 | A | Vehicle stability control unit, wheel sensor | 1.5 hours |
| 12, 20 | B | Steering angle sensor | 2 hours |
| 11, 20, 25 | C | Yaw rate sensor | 2 hours |
| ... | ... | ... | ... |

For example, a combination of DTCs 12 and 20 indicates that the underlying issue is B, which can be resolved by replacing the steering angle sensor, which will take approximately 2 hours at the servicing dealer. Similarly, a combination of DTCs 7, 8, 9, and 10 indicates that the underlying issue is A, which can be fixed by replacing the vehicle stability control unit and a wheel sensor.

Next, at step 306, an appointment request is sent from the vehicle to an appointment scheduling center. The appointment request is typically sent to the scheduling center with the DTC analysis information from step 304 or portions thereof. The appointment scheduling center can comprise a server or a network of computers and/or operators in communication with each other. In a preferred embodiment, the appointment scheduling center comprises a server, thereby further streamlining the service scheduling process.

The method further comprises (at step 308) identifying the user, the user's preferences, and/or vehicle identification number (VIN), and identifying the servicing dealer or service provider (at step 310) upon receiving the appointment request and DTC analysis information. The dealer can be selected based on geography, proximity to the vehicle's current location, user-preferences, pre-designated choices, etc. The method typically comprises determining whether the required parts are available at the dealer. If the required parts are available at the dealer, then the method proceeds to step 312; otherwise, the back order/shipping status of the parts are checked. If needed, the required parts are shipped from the parts manufacturers or warehouses to the dealer.

At step 312, the method further comprises checking the dealer schedule to determine the available days/times at the selected dealer. Next, step 314 comprises selecting a proposed day/time slot for the service appointment based at least in on the selected dealer's available times, the parts, and estimated times needed to address or repair the underlying issues. The proposed day/time slot can be selected based at least in part on user's scheduling preferences (e.g., preferred days and times for service appointments). In one approach, the user registers his/her appointment scheduling preferences (e.g., Monday, Wednesday, and Friday from 7-11 AM, Tuesday and Thursday from 3-6 PM) in a centralized database and/or at one or more of the dealers. In the present embodiment, the selected day/time slot is the first available slot that satisfies the one or more of the above criteria. For example, the selection of the proposed time slot can comprises: obtaining vehicle user's scheduling preferences; checking dealer's service appointment schedule; and selecting as the proposed time slot the earliest available slot in the dealer's service appointment schedule that satisfies the vehicle user's scheduling preferences.

The proposed date/time—i.e., the first available date/time in the present embodiment—can be sent to the user via radio broadcast, email, or the like. The proposed date/time for the appointment can be transmitted to the user via any suitable approach known in the art, such as broadcast radio signals, cellular wireless communication, the Internet, or combinations thereof. In one embodiment, the information regarding the proposed time slot for the appointment is sent by broadcasting the information to the respective identified vehicles (e.g., via a satellite radio broadcast system). In another embodiment, the information is sent via wireless transmission to the respective vehicle users' mobile phones. In yet another embodiment, the information is sent via email to the respective vehicle users' email addresses. In still another embodiment, the information is transmitted to a database accessible by the dealer.

As mentioned above, the proposed date/time can be displayed on a vehicle display unit, provided in an audio format over the vehicle's audio system, etc. The user can accept/decline the proposed date/time in any suitable manner known in the art, such as by pushing a button on or near the display unit, uttering a response picked up by a microphone and delivered to an onboard voice recognition system, etc. If the user declines the proposed date/time, an alternative proposed day/time for the vehicle service is selected and sent to the user. The method preferably further comprises confirming that the accepted date/time is still available at the dealer when the user accepts the proposed date/time, and optionally confirming the accepted date/time with the user.

Figure 5:
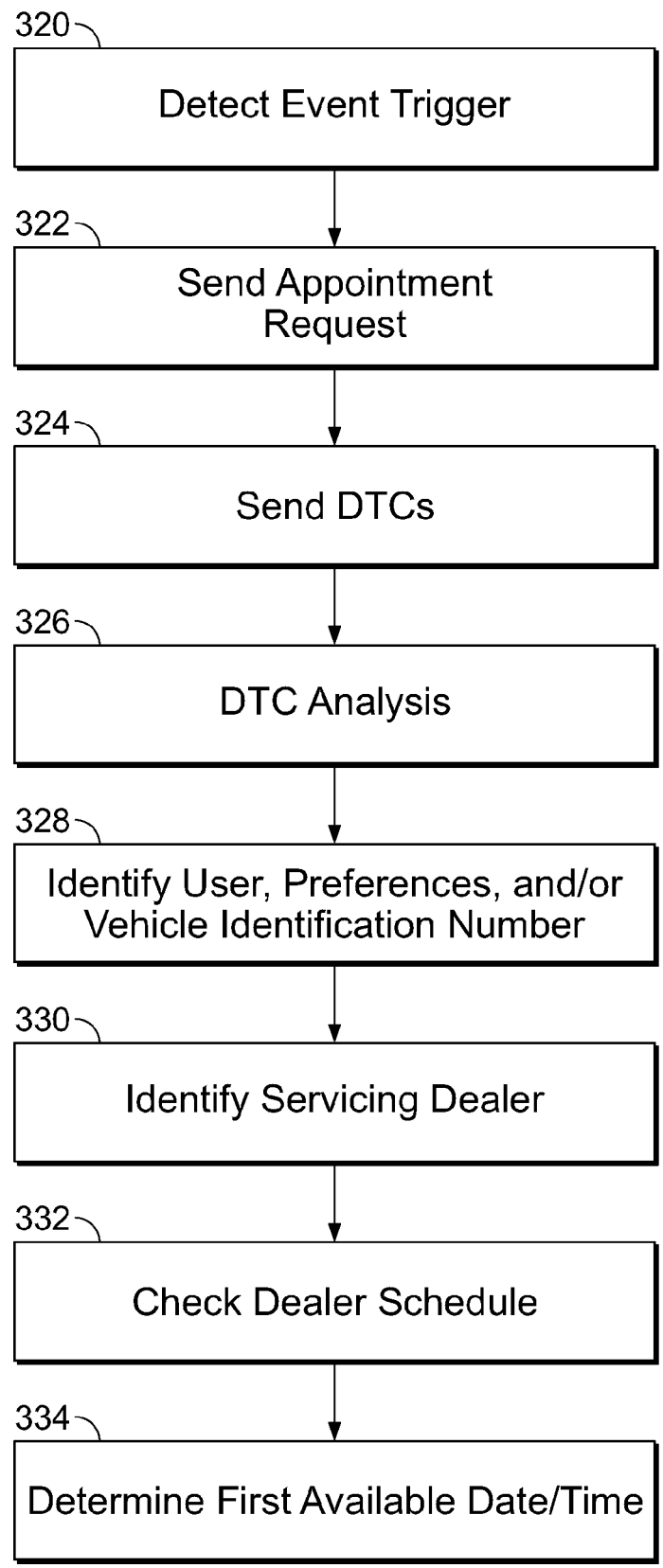
FIG. 5 outlines the steps of an exemplary off-board approach to scheduling vehicle service appointments via diagnostic trouble code analysis.

FIG. 5 illustrates an exemplary method for scheduling a service appointment, wherein the DTCs are analyzed off-board the vehicle. First, in step 320, a trigger event is detected. The trigger event can comprise a DTC notifying the user of an issue with the vehicle; alternatively, the trigger event results in the generation of one or more DTCs in response to the detected trigger event. At step 324, the DTCs are transmitted from the vehicle to another location, such as an appointment scheduling center or server.

The ability to send all the DTCs off-board to a server for analysis eliminates or reduces onboard DTC analysis, which in turn eliminates or reduces on board memory and processing requirements. It also allows the servers to be constantly updated with more information and updates, while not having to update the onboard analysis logic, etc. As such, it is no longer necessary to update certain codes/logic via broadcast, etc. that would otherwise be stored onboard the vehicle.

Next, step 326 comprises analyzing the DTCs, such as by referencing a table or database of DTCs, underlying vehicle issues/problems, parts needed, estimated time needed to address the underlying vehicle issues, etc., as explained above with reference to FIG. 4. The method further comprises (at step 328) identifying the user, the user's preferences, and/or VIN, and identifying the servicing dealer or service provider (at step 330) upon receiving the appointment request and DTC analysis information. The dealer can be selected based on geography, proximity to the vehicle's current location, user-preferences, pre-designated choices, etc. The method typically comprises determining whether the required parts are available at the dealer. If the required parts are available at the dealer, then the method proceeds to step 332; otherwise, the back order/shipping status of the parts are checked. If needed, the required parts are shipped from the parts manufacturers or warehouses to the dealer.

At step 332, the method further comprises checking the dealer schedule to determine the available days/times at the selected dealer. Next, step 334 comprises selecting a proposed day/time slot for the service appointment based at least in on the selected dealer's available times, the parts, and estimated times needed to address or repair the underlying issues, as explained above with reference to FIG. 4. In the present embodiment, the selected day/time slot is the first available slot that satisfies the one or more of the above criteria.

As with the method for onboard analysis of the DTCs, the proposed date/time—i.e., the first available date/time in the present embodiment—can be sent to the user via radio broadcast, email, or the like. The proposed date/time for the appointment can be transmitted to the user via any suitable approach known in the art, such as broadcast radio signals, cellular wireless communication, the Internet, or combinations thereof. The proposed date/time can be displayed on a vehicle display unit, provided in an audio format over the vehicle's audio system, etc. The user can accept/decline the proposed date/time in any suitable manner known in the art, such as by pushing a button on or near the display unit, uttering a response picked up by a microphone and delivered to an onboard voice recognition system, etc. If the user declines the proposed date/time, an alternative proposed day/time for the vehicle service is selected and sent to the user. The method preferably further comprises confirming that the accepted date/time is still available at the dealer when the user accepts the proposed date/time, and optionally confirming the accepted date/time with the user.

It will be noted that the methods outlined in FIGS. 4 and 5 are merely exemplary embodiments of the invention. In other embodiments, subsets, different combinations, and variations of the steps described with respect to FIGS. 4 and 5 can be used to analyze DTCs and schedule a service appointment. Features of any of the foregoing methods and systems may be substituted or added into the others, as will be apparent to those of skill in the art.

Having thus described a preferred embodiment of a method and system for analyzing DTCs and proactively scheduling vehicle service appointments, it should be apparent to those skilled in the art that certain advantages of the within system have been achieved. It should also be appreciated that various modifications, adaptations, and alternative embodiments thereof may be made within the scope and spirit of the present invention. For example, the use of broadcast communication networks has been illustrated, but it should be apparent that many of the inventive concepts described above would be equally applicable to the use of other non-broadcast communication networks.

What is claimed is:

1. A system for scheduling a vehicle service appointment, comprising:
   a sensor for detecting a trigger event;
   a transmitter;
   a receiver;
   a processor module operatively coupled to the sensor, the transmitter, and the receiver; and
   a memory module operatively coupled to the processor module, the memory module comprising executable code for the processor module to:
   generate a plurality of diagnostic trouble codes (DTCs) in response to the detected trigger event;
   analyze the DTCs to determine an underlying problem;
   determine parts needed to repair the underlying problem;
   estimate time needed to repair the underlying problem;
   identify a servicing dealer;
   automatically command the transmitter to transmit an appointment request and information regarding the DTCs to an appointment scheduling center;
   wherein the receiver receives a broadcast data message from the appointment scheduling center, the broadcast data message comprising a message portion and a filter code section, the filter code section comprising coded criteria that specify characteristics of intended recipients of the message portion;
   the receiver further comprising a filter processing section that is configured to read the filter code section of the broadcast data message to determine whether the vehicle is an intended recipient of the message portion, wherein the receiver stores the broadcast data message in the memory module;
   wherein the filter processing section recovers the message portion of the broadcast data message stored in the memory module, if the vehicle is an intended recipient, and discards the message portion, if the vehicle is not an intended recipient;
   wherein the recovered message portion from the memory module includes a proposed date/time slot for the vehicle service appointment sent from the appointment scheduling center by an electronic message without any participation by a user;
   wherein the proposed date/time slot for the service appointment is based at least on the parts and the estimated time needed to repair the underlying problem and one or more available time slots at the identified servicing dealer; and
   wherein the proposed date/time slot from the appointment scheduling center included in the recovered message portion is displayed on a vehicle display unit to a vehicle occupant.

2. The system as recited in claim 1, wherein the processor module analyzes the DTCs by referencing a database that links combinations of DTCs to potential underlying problems.

3. The system as recited in claim 2, wherein the database further comprises information regarding parts and estimated times needed to repair the potential underlying problems.

4. The system as recited in claim 1, wherein the command to transmit the appointment request occurs automatically in response to analyzing the DTCs.

5. The system as recited in claim 1, wherein the proposed date/time slot is a single date and time for the service appointment at the identified servicing dealer.

6. A system for scheduling a vehicle service appointment, comprising:
   a memory;
   a processor module operatively coupled to the memory;
   wherein the system receives data comprising a plurality of diagnostic trouble codes (DTCs) from at least one vehicle;
   wherein the processor, in response to the data, is programmed to:
   analyze the received DTCs to determine an underlying problem;
   determine parts needed to repair the underlying problem;
   estimate time needed to repair the underlying problem;
   identify a servicing dealer;
   automatically select a proposed date/time slot for the service appointment with the identified servicing dealer based at least in part on the parts and the estimated time needed to repair the underlying problem and one or more available time slots at the identified servicing dealer;

wherein the system is further configured to generate at least one broadcast data message comprising a plurality of individual message components that are each intended for a specific vehicle;

wherein at least one of the plurality of individual message components includes the proposed date/time slot and is intended for the at least one vehicle;

wherein the system automatically sends the at least one broadcast data message including the proposed date/time slot to a plurality of vehicles, including the at least one vehicle, via a one-to-many communication system;

wherein the at least one broadcast data message is configured for processing by a filter processing section so that the broadcast data message is stored in a memory module and the at least one of the plurality of individual message components is recovered from the broadcast data message, if the at least one vehicle is an intended recipient, and the broadcast data message is discarded, if the at least one vehicle is not an intended recipient; and wherein the proposed date/time slot included in the at least one of the plurality of individual message components is configured for display on a vehicle display unit onboard the at least one vehicle.

7. The system as recited in claim 6, wherein the processor module selects the proposed date/time slot based at least in part on vehicle user preferences.

8. The system as recited in claim 6, wherein the processor module selects the proposed date/time slot by determining one or more first available date/time slots with the identified servicing dealer.

9. The system as recited in claim 6, wherein the processor module analyzes the DTCs by referencing a database that links combinations of DTCs to potential underlying problems.

10. The system as recited in claim 9, wherein the database further comprises information regarding parts and estimated times needed to repair the potential underlying problems.

11. A method for scheduling a service appointment for a vehicle, comprising:

detecting a trigger event by at least one sensor;

generating a plurality of diagnostic trouble codes (DTCs) in response to the detected trigger event using a processor in communication with the at least one sensor;

the processor being further configured to perform the steps of:

analyzing the DTCs to determine an underlying problem;
determining parts needed to repair the underlying problem;
estimating time needed to repair the underlying problem;
identifying a servicing dealer; and
generating a command to a transmitter for transmitting an appointment request and information regarding the DTCs from the vehicle to an appointment scheduling center;

receiving with a receiver a broadcast data message from the appointment scheduling center, the broadcast data message comprising a message portion and a filter code section, the filter code section comprising coded criteria that specify characteristics of intended recipients of the message portion;

reading the filter code section of the broadcast data message using a filter processing section associated with the receiver and determining whether the vehicle is an intended recipient of the message portion;

storing the broadcast data message in a memory module, wherein the filter processing section recovers the message portion of the broadcast data message stored in the memory module, if the vehicle is an intended recipient, and discards the message portion, if the vehicle is not an intended recipient;

the recovered message portion of the broadcast data message including a proposed date/time slot for the service appointment, wherein the proposed date/time slot for the service appointment is based at least on the parts and the estimated time needed to repair the underlying problem and one or more available time slots at the identified servicing dealer; and displaying on a vehicle display unit the proposed date/time slot included in the recovered message portion from the appointment scheduling center.

12. The method of claim 11, wherein analyzing the DTCs comprises referencing a database that links combinations of DTCs to potential underlying problems.

13. The method of claim 11, wherein the transmitting step occurs automatically in response to the step of analyzing the DTCs.

14. The method of claim 11, wherein the proposed date/time slot comprises a single available date and time for the service appointment at the identified servicing dealer.

15. The method of claim 11, further comprising providing an option to the user to accept or decline the proposed date/time slot displayed on the vehicle display unit.

16. A method for scheduling a service appointment for a vehicle, comprising:

receiving data comprising a plurality of diagnostic trouble codes (DTCs) from at least one vehicle;

analyzing with a processor the received DTCs to determine an underlying problem;

determining parts needed to repair the underlying problem;
estimating time needed to repair the underlying problem;
identifying a servicing dealer; and selecting a proposed date/time slot for the service appointment with the identified servicing dealer based at least in part on the parts and the estimated time needed to repair the underlying problem and one or more available time slots at the identified servicing dealer;

generating at least one broadcast data message comprising a plurality of individual message components that are each intended for a specific vehicle, wherein at least one of the plurality of individual message components includes the proposed date/time slot and is intended for the at least one vehicle;

automatically sending the at least one broadcast data message including the proposed date/time slot to a plurality of vehicles, including the at least one vehicle, via a one-to-many communication system;

wherein the at least one broadcast data message is configured for processing by a filter processing section so that the broadcast data message is stored in a memory module and the at least one of the plurality of individual message components is recovered from the broadcast data message, if the at least one vehicle is an intended recipient, and the broadcast data message is discarded, if the at least one vehicle is not an intended recipient; and wherein the proposed date/time slot included in the at least one of the plurality of individual message components is configured for display on a vehicle display unit onboard the at least one vehicle.

17. The method of claim 16, wherein selecting the proposed date/time slot comprises selecting the proposed date/time slot based at least in part on vehicle user preferences.

18. The method of claim 16, wherein selecting the proposed date/time slot comprises selecting a first available date/time slot with the identified servicing dealer.

19. The method of claim 16, wherein analyzing the DTCs comprises referencing a database that links combinations of DTCs to potential underlying problems.

20. The method of claim 16, further comprising receiving an acceptance of the proposed date/time slot from a user; and confirming that the proposed date/time slot remains available at the identified servicing dealer.

* * * * *